(12) United States Patent
Katsuyama et al.

(10) Patent No.: US 7,142,716 B2
(45) Date of Patent: Nov. 28, 2006

(54) APPARATUS FOR SEARCHING DOCUMENT IMAGES USING A RESULT OF CHARACTER RECOGNITION

(75) Inventors: Yutaka Katsuyama, Kawasaki (JP); Satoshi Naoi, Kawasaki (JP); Fumihito Nishino, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 618 days.

(21) Appl. No.: 09/949,891

(22) Filed: Sep. 12, 2001

(65) Prior Publication Data

US 2002/0154817 A1    Oct. 24, 2002

(30) Foreign Application Priority Data

Apr. 18, 2001 (JP) .............................. 2001-120031

(51) Int. Cl.
*G06K 9/72* (2006.01)

(52) U.S. Cl. .................. 382/190; 382/176; 382/229; 382/306; 707/3; 707/6

(58) Field of Classification Search .............. 382/100, 382/101, 159, 177, 181, 185, 186, 195, 209, 382/226, 228, 305, 309, 310, 175, 176, 190, 382/229, 306; 707/3, 4, 10, 6
See application file for complete search history.

(56) References Cited

U.S. PATENT DOCUMENTS

| | | | | | |
|---|---|---|---|---|---|
| 5,020,117 | A | * | 5/1991 | Ooi et al. | 382/185 |
| 5,418,864 | A | * | 5/1995 | Murdock et al. | 382/309 |
| 5,434,932 | A | * | 7/1995 | Scott | 382/309 |
| 5,455,872 | A | * | 10/1995 | Bradley | 382/228 |
| 5,519,786 | A | * | 5/1996 | Courtney et al. | 382/159 |
| 5,524,065 | A | * | 6/1996 | Yagasaki | 382/226 |
| 5,621,818 | A | * | 4/1997 | Tashiro | 382/227 |
| 5,625,710 | A | * | 4/1997 | Katsuyama et al. | 382/209 |
| 5,644,652 | A | * | 7/1997 | Bellegarda et al. | 382/186 |
| 5,805,747 | A | * | 9/1998 | Bradford | 382/310 |
| 5,889,897 | A | * | 3/1999 | Medina | 382/310 |
| 5,905,811 | A | * | 5/1999 | Shiiyama et al. | 382/229 |
| 5,949,906 | A | * | 9/1999 | Hontani et al. | 382/177 |
| 6,047,093 | A | * | 4/2000 | Lopresti et al. | 382/310 |
| 6,208,744 | B1 | * | 3/2001 | Ishige et al. | 382/100 |
| 6,263,121 | B1 | * | 7/2001 | Melen et al. | 382/305 |
| 6,298,173 | B1 | * | 10/2001 | Lopresti | 382/305 |

(Continued)

FOREIGN PATENT DOCUMENTS

JP    A-4-92971    3/1992

(Continued)

OTHER PUBLICATIONS

Hiroshi Murase, et al., "Segmentation and Recognition of Hand-Written Character String Using Linguistic Information", IEICE Transactions '86/9vol. J69-D, No. 9., pp. 1292-1301 (Partial translation (3.4 "Search for Kth minimum cost path via a dynamic programming approach", pp. 1296-1297)).

*Primary Examiner*—Gregory Desire
(74) *Attorney, Agent, or Firm*—Staas & Halsey LLP

(57) ABSTRACT

A document image search apparatus generates a text by performing the character recognition of a document image and determines a re-process scope. Then, the apparatus generates a candidate character lattice from the re-recognition result of the re-process scope, generates character strings from the candidate character lattice and adds the character strings to the text. Then, the apparatus performs index search using the text with the character strings added.

17 Claims, 12 Drawing Sheets

U.S. PATENT DOCUMENTS

| | | | |
|---|---|---|---|
| 6,310,971 B1 * | 10/2001 | Shiiyama | 382/181 |
| 6,341,176 B1 * | 1/2002 | Shirasaki et al. | 382/229 |
| 6,343,149 B1 * | 1/2002 | Motoiwa | 382/209 |
| 6,470,336 B1 * | 10/2002 | Matsukawa et al. | 707/4 |
| 6,473,524 B1 * | 10/2002 | Reda et al. | 382/195 |
| 6,480,838 B1 * | 11/2002 | Peterman | 707/3 |
| 6,546,385 B1 * | 4/2003 | Mao et al. | 707/3 |
| 6,678,683 B1 * | 1/2004 | Shiiyama | 707/10 |
| 6,741,724 B1 * | 5/2004 | Bruce et al. | 382/101 |
| 6,766,069 B1 * | 7/2004 | Dance et al. | 382/309 |
| 6,944,344 B1 * | 9/2005 | Imagawa et al. | 382/229 |
| 7,010,519 B1 * | 3/2006 | Tada et al. | 707/3 |
| 2002/0154817 A1 * | 10/2002 | Katsuyama et al. | 382/190 |
| 2004/0220919 A1 * | 11/2004 | Kobayashi | 707/3 |
| 2006/0062453 A1 * | 3/2006 | Schacht | 382/164 |

FOREIGN PATENT DOCUMENTS

| | | |
|---|---|---|
| JP | A-4-328682 | 11/1992 |
| JP | A-7-182465 | 7/1995 |
| JP | A-9-134369 | 5/1997 |
| JP | A-10-207988 | 8/1998 |

* cited by examiner 0 1 2 3 4 5 6 7 8 9
開発検証センター

| i | j | | | | | | | | | | |
|---|---|---|---|---|---|---|---|---|---|---|---|
| 0 | 1 | 開:718 | 関:978 | 閑:1030 | 閨:1055 | 閭:1063 | 閠:1067 | 閣:1080 | 閤:1091 | 閧:1094 | 閨:1097 |
| 1 | 2 | 発:755 | 門:1080 | 琵:1265 | 毫:1283 | 売:1291 | 亮:1306 | 弗:1308 | 姥:1323 | 禿:1330 | |
| 2 | 3 | 検:753 | 横:1058 | 検:1070 | 棟:1087 | 棟:1105 | 桂:1120 | 桟:1129 | 棧:1132 | 枝:1143 | 栓:1146 |
| 3 | 4 | 証:708 | 証:1049 | 註:1064 | 記:1090 | 訣:1153 | 訟:1196 | 証:1266 | 誣:1295 | 詠:1306 | 誰:1321 |
| 4 | 5 | セ:584 | セ:1073 | ゼ:1308 | t:1478 | む:1668 | | | | | |
| 4 | 6 | 抄:1466 | め:1515 | ピ:1568 | め:1568 | 物:1587 | ⓔ:1593 | b:1595 | の:1600 | ゆ:1610 | |
| 5 | 6 | シ:447 | シ:1241 | >:1365 | ジ:1610 | ッ:1700 | ッ:1737 | ツ:1737 | つ:1772 | | |
| 5 | 7 | ":1603 | 乃:1732 | 刀:1752 | 功:1773 | 豹:1814 | 鮒:1820 | 鋤:1839 | %:1849 | | |
| 5 | 8 | ":1514 | ":1665 | 刀:1669 | ":1708 | 亦:1712 | ガ:1721 | | | | |
| 6 | 7 | ;:1533 | 9:1604 | り:1763 | 十:1786 | ):1837 | ):1845 | ):1904 | (:1932 | | |
| 6 | 8 | タ:1044 | タ:1064 | ク:1327 | ダ:1389 | ケ:1614 | ケ:1616 | ::1807 | | | |
| 6 | 9 | 外:1679 | 鮑:1810 | い:1837 | ::1849 | い:1850 | ":1868 | 好:1877 | ゆ:1891 | | |
| 7 | 8 | !:931 | i:1089 | I:1131 | 0:1139 | | | | | | |
| 7 | 9 | い:1589 | 伶:1658 | 伶:1769 | 俗:1770 | 悟:1773 | 始:1831 | 蛤:1856 | キ:1859 | 膳:1865 | |
| 8 | 9 | ±:1210 | と:1507 | ≡:1560 | さ:1646 | 仝:1672 | △:1675 | 会:1694 | 室:1697 | L:1709 | 亀:1729 |

| i | j | | | | |
|---|---|---|---|---|---|
| 0 | 1 | F:490 | 「:1184 | P:1225 | 〔:1362 |
| 0 | 2 | 剛:1305 | 附:1332 | 川:1340 | 刑:1350 |
| 1 | 2 | M:507 | m:1163 | Ⅲ:1181 | Ⅷ:1341 |
| 1 | 3 | ル:1401 | 什:1466 | 肺:1556 | 酢:1604 |
| 2 | 3 | ―:605 | ‐:713 | ＿:796 | ―:885 |
| 2 | 4 | イ:1676 | ィ:1679 | Y:1707 | 1:1824 |
| 3 | 4 | V:204 | v:554 | y:761 | Y:861 |
| 4 | 5 | シ:854 | ジ:1511 | ン:1514 | レ:1522 |
| 5 | 6 | I:687 | i:697 | !:746 | 1:840 |
| 5 | 7 | リ:832 | U:906 | ワ:1096 | ヮ:1136 |
| 6 | 7 | j:1090 | 」:1100 | J:1172 | ノ:1203 |
| 7 | 8 | ―:268 | ‐:269 | ＿:270 | ￣:382 |
| 8 | 9 | ズ:628 | ス:1053 | x:1500 | 式:1527 |

FIG. 8

```
EXTRACTED WORDS
(IN THE CASE OF A NOUN)
    FM−Vシリーズ
    FM−vシリーズ
    FM−yシリーズ
    FM−Yシリーズ
    FM−Vシリーズ
    FM−vシリーズ
    FM−yシリーズ
    FM−Yシリーズ
    FM_Vシリーズ
    FM_vシリーズ
    FM_yシリーズ
    FM_Yシリーズ
```

FIG. 9

```
EXTRACTED WORDS (IN THE CASE OF AN UNREGISTERED WORD)
  FM-Vシリーズ
  FM-Vシリーズ
  FM-Vシリーズ
  FM-Vシリーズ
  FM-VシIjーズ
  FM-VシIjーズ
  FM-Vシijーズ
  FM-VシIﾞーズ
  FM-VシIﾞーズ
  FM-Vシijーズ
  FM-Viﾞーズ
  FM-Viﾞーズ
  FM-VシU-ズ
  FM-VシU-ズ
  FM-VシIjーズ
  FM-VシIjーズ
  FM-Vシijーズ
  FM-VシIﾞーズ
  FM-Vシijーズ
  FM-VシIﾞーズ
  FM-Viﾞーズ
  FM-Viﾞーズ
  FM-VシU-ズ
  FM-VシU-ズ
  FM-vシリーズ
  FM-vシリーズ
```

FIG. 10

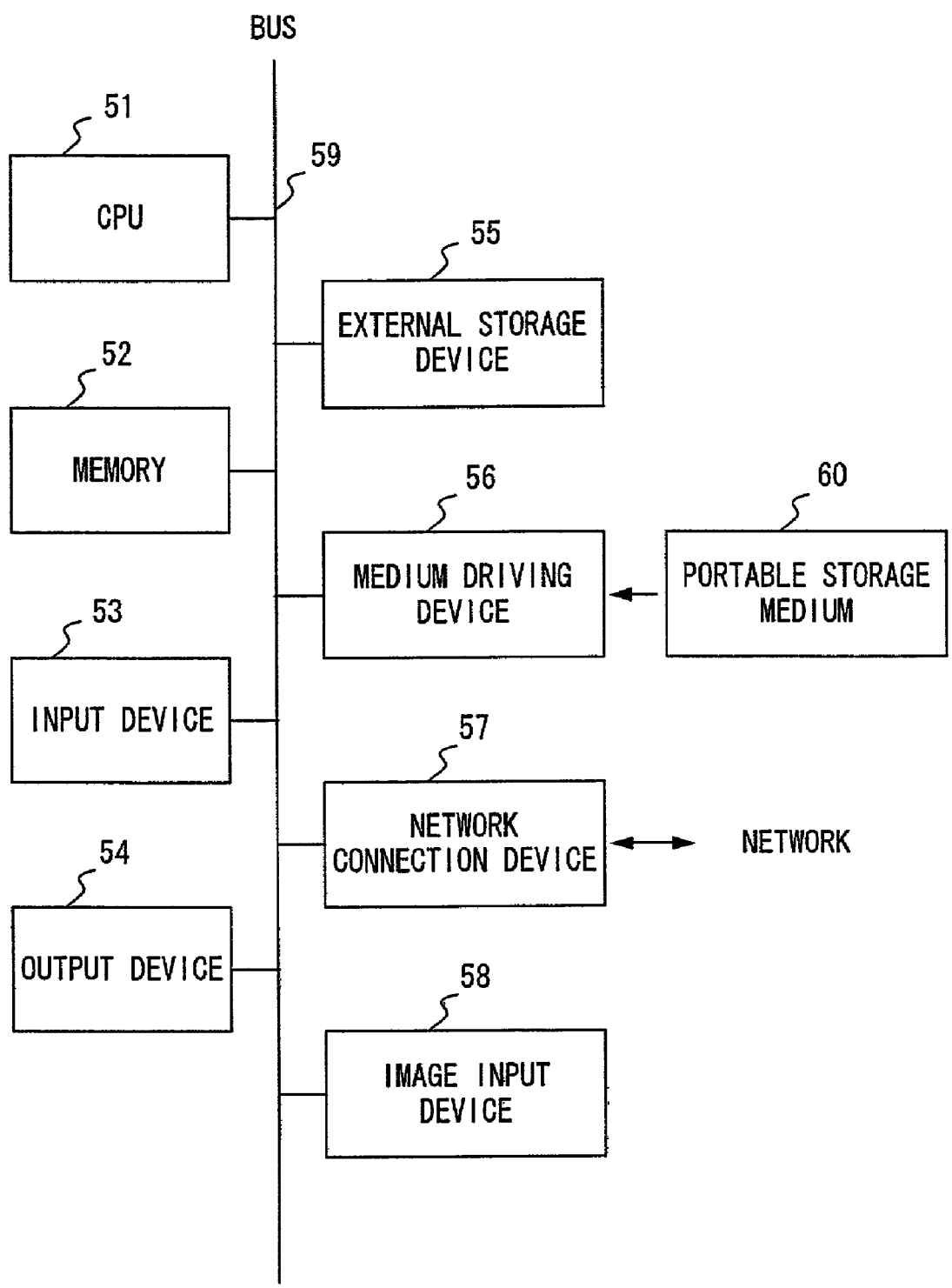
F I G. 11

APPARATUS FOR SEARCHING DOCUMENT IMAGES USING A RESULT OF CHARACTER RECOGNITION

BACKGROUND OF THE INVENTION

1. Field of the Invention

The present invention relates to an apparatus for searching document images using a result obtained by character-recognizing the document images.

2. Description of the Related Art

Lately, a document management system for digitizing a paper document using a scanner and the like and sharing the document has been used to contribute to the improvement of business efficiency from the viewpoint of both information sharing and rapid access in organizations, such as enterprises and the like. In a personal environment too, a personal computer has been popular and needs for a document management system has increased since an electronic document must be linked with a conventional paper document.

In a document management system, a paper document is read using a scanner, and the document image is stored. However, a keyword must be attached in order to search the image later. There are a variety of methods for attaching a keyword. As one of them, there is a full-text search.

In this method, instead of attaching a special word that summarizes and represents a document, as a keyword, the full text of the document is used for search. In other words, the full text is searched using a keyword character inputted for search. In this case, there is no need to select a word for summarizing the document nor there is any fear as to whether the summary word really represents the document. Therefore, although it has a disadvantage that it takes a long process time, the method is widely used.

This full-text search technology is largely classified into two categories. One is a so-called grep search method for collating an inputted keyword with a text to be searched word by word. The other is an index search method for preparing an index for search based on the text to be searched in advance and collating a keyword with this index when the keyword is inputted. Generally, grep search is practical in the case of a small amount of document, while in the case of a large amount of document, index search is recommended since the grep search takes too much of a search time.

If in a general document management system, a paper document is searched, at the time of document registration, a character area is automatically extracted from a document image, a text is generated by character-recognizing the area, and both the document image and recognized text are paired and managed as one document. When documents are searched, the stored text is collated with an inputted keyword and a corresponding document is extracted.

In this case, in the system of a large organization, full-text search is used to improve search accuracy, and index search is used to improve search speed, instead of grep search. However, since the accuracy of a character recognition process is not 100%, there is always a recognition error. For this reason, the search accuracy of a text after recognition sometimes degrades. As a conventional art for preventing the degradation of the search accuracy due to such a recognition error, the following technologies are used.

(1) A Technology for Generating a Correct Text by Automatically Correcting Wrongly Recognized Characters to Improve Search Accuracy (a) Japanese Patent Application Laid-open No. 7-182465, "Character Recognition Method" (1995).

In this method, when characters are recognized, a confidence degree is calculated, a word dictionary is consulted using one candidate character with a specific confidence degree as an index, and candidate words are extracted. Then, a character string with the highest probability is generated based on the location information as well as the collation cost of a word, and the first candidate is replaced with this character string.

(b) Japanese Patent Application Laid-open No. 10-207988, "Character Recognition Method and Character Recognition Apparatus" (1998).

In this method, a candidate character with a specific confidence degree is generated by character recognition, and if the first candidate includes a low confidence degree character, a plurality of three-character character strings are generated using one candidate character, the confidence degree of which is equal to or more than a specific threshold value, out of the three candidate characters, which consist of the low confidence degree character, one character before the character and one character after the character. Then, an already stored correct text document is searched using these character strings, a character string that most frequently appears is designated to be a correct character string, and the recognition result is automatically corrected. In this case, it is assumed that there is already a large amount of correct text.

(2) A Technology for Expanding a Keyword into a Plurality of Keywords to Improve Search Accuracy at the Time of Search (c) Japanese Patent Application Laid-open No. 4-92971, "Image Recording Apparatus" (1992).

In this method, a keyword character string inputted at the time of search is expanded into a plurality of character strings, and results obtained by searching a document using all the obtained search character strings are integrated and outputted. When a keyword character string is expanded, a search character string is generated by specifying a wrongly recognized character that is easily mistaken for a specific character, using a recognition error table and replacing the wrongly recognized character with a correct character.

(d) Japanese Patent Application Laid-open No. 4-328682, "Image Recording Apparatus" (1992).

In this method, when a keyword is collated with a search target, up to N characters of collation error are neglected and regarded to be correctly collated.

However, the conventional search methods described above have the following problems.

In the method (1) using automatic correction, since the accuracy of the automatic correction is not 100%, all wrongly recognized characters are not always corrected. This is a method of generating a uniquely determined character string as a correction result and replacing the original text with the character string, and only one candidate character string is used for that purpose. Therefore, if the generated character string is wrong, search is also impossible. Thus, the accuracy of extracting a correct text for search from recognition result information is not sufficient.

In the method (2) using keyword expansion, since the candidate character information of a recognition result is not used, a lot of character strings for search are generated. In other words, since recognition result information is not sufficiently used, a lot of inappropriate search keywords are generated even for an ambiguous search method. Therefore, a search time becomes enormous and search accuracy also degrades. Furthermore, in the method (d), since the method cannot be implemented in ordinary text search, a special search method is needed.

SUMMARY OF THE INVENTION

It is an object of the present invention to provide a document image search apparatus for making a high-accuracy search despite a recognition error when document images are searched using character recognition.

The document image search apparatus of the present invention comprises an input device, a character recognition device, a scope determination device, an addition device and a search device. The input device inputs a document image. The character recognition device character-recognizes the document image and generates a text of a recognition result. The scope determination device determines the re-process scope of character recognition in the document image. The addition device adds a text obtained by conducting the character recognition of the re-process scope again to the text of the recognition result and generates a text for search. The search device searches document images using the text for search.

BRIEF DESCRIPTION OF THE DRAWINGS

FIG. 4 shows a first character string image;

FIG. 5 shows a first candidate character lattice;

FIG. 7 shows a second character string image;

FIG. 8 shows a second candidate character lattice;

FIG. 9 shows a first word list;

FIG. 10 shows a second word list;

FIG. 11 shows the configuration of an information processing device;

DESCRIPTION OF THE PREFERRED EMBODIMENTS

The preferred embodiments of the present invention are described in detail below with reference to the drawings.

Figure 1:
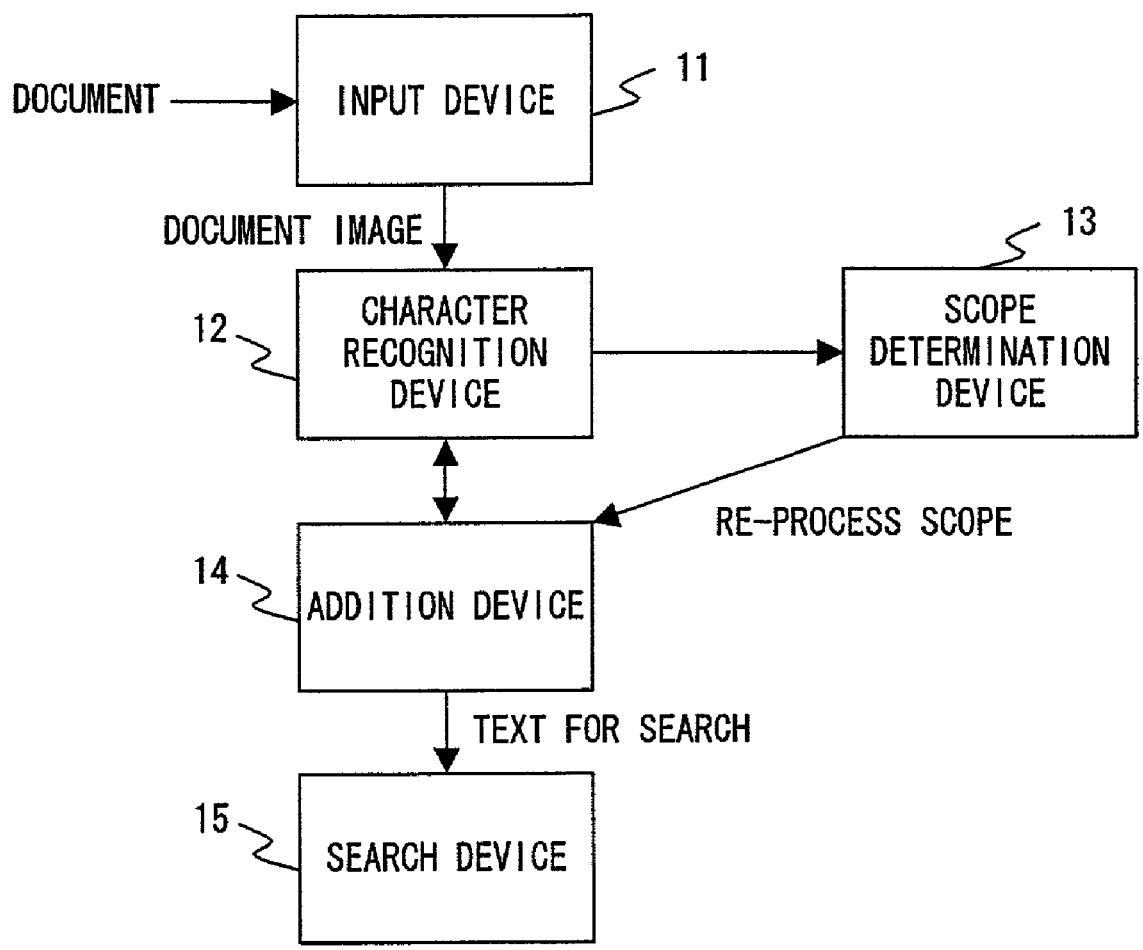
FIG. 1 shows the basic configuration of the document image search apparatus of the present invention.

FIG. 1 shows the basic configuration of the document image search apparatus of the present invention. The document image search apparatus shown in FIG. 1 comprises an input device 11, a character recognition device 12, a scope determination device 13, an addition device 14 and a search device 15.

The input device 11 inputs a document image. The character recognition device 12 character-recognizes the document image and generates a text of a recognition result. The scope determination device 13 determines the re-process scope of character recognition in the document image. The addition device 14 adds a text obtained by conducting the character recognition of the re-process scope again to the text obtained of the recognition result and generates a text for search. The search device 15 searches document images using the text for search.

A document image inputted by the input device 11 is character-recognized by the character recognition device 12, and a text is generated as the recognition result. The scope determination device 13 determines the scope of the re-process of character recognition and transfers information indicating the scope to the addition device 14.

The addition device 14 requests the character recognition device 12 to conduct the character recognition of the re-process scope again based on the received information and generates a text different from the recognition result obtained in the first place, from the re-process result. Then, the addition device 14 generates a text for search by adding the text to the text obtained as the first recognition result and stores the text for search. The search device 15 searches the document images using the stored text for search.

According to such a document image search apparatus, a new character string text can be added as another candidate of the recognition result by the character re-recognition. Therefore, even if there is a recognition error in the first character recognition, a new correct character string can be added to the text for search, and search accuracy can be improved accordingly. Since a specific re-process scope is designated and the character recognition of only the area in the scope is conducted again, the number of character strings of other candidates is prevented from meaninglessly increasing, and efficient search is possible accordingly.

Figure 2:
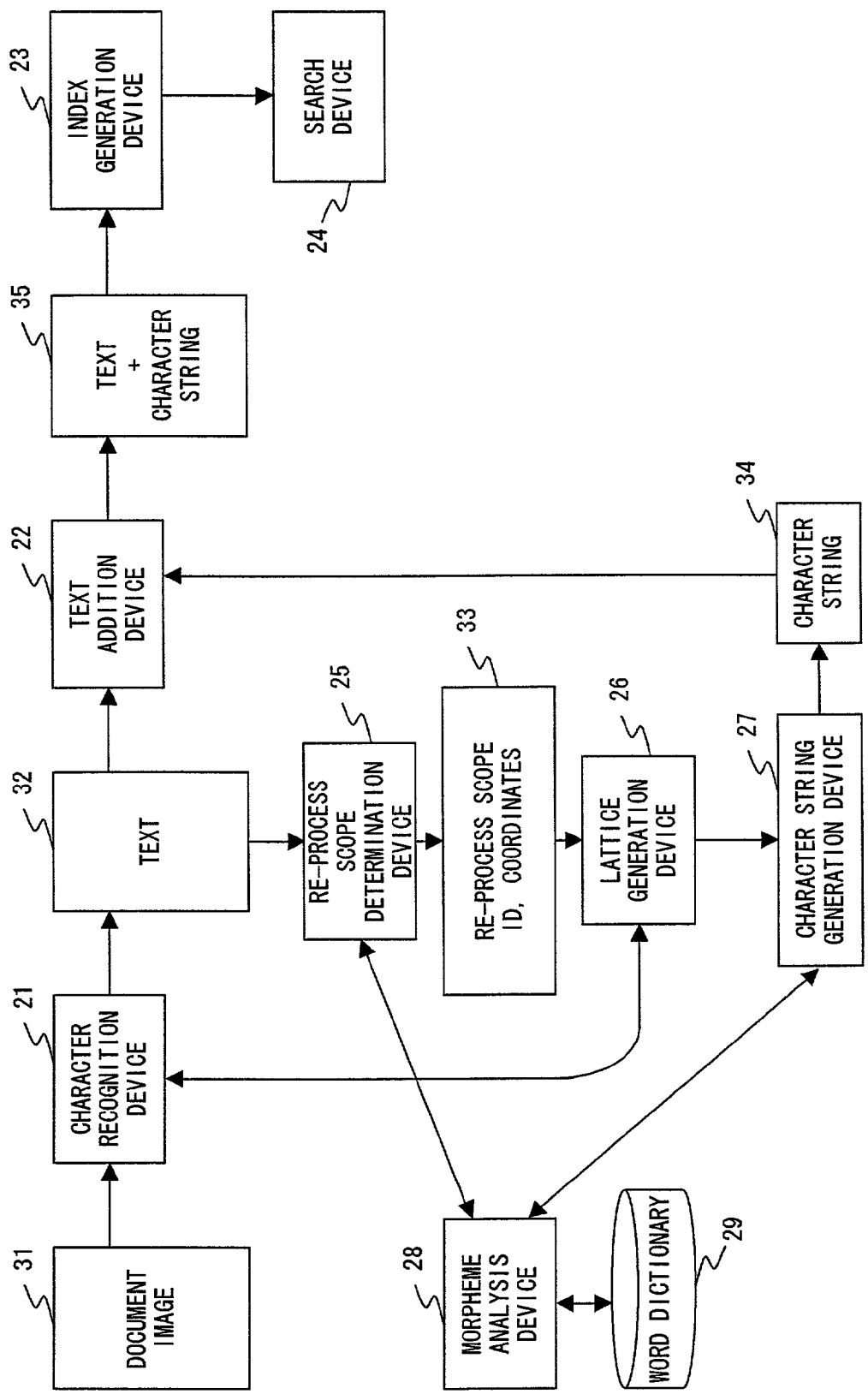
FIG. 2 shows the configuration of the document image search apparatus.

The input device shown in FIG. 1, for example, corresponds to the image input device 58 shown in FIG. 11, which is described later. The character recognition device 12 shown in FIG. 1, for example, corresponds to the character recognition device shown in FIG. 2, which is described later. The scope determination device 13, for example, corresponds to both the re-process scope determination device 25 and morpheme analysis device 28, which are shown in FIG. 2. The addition device 14 shown in FIG. 1, for example, corresponds to the text addition device 22, lattice generation device 26, character string generation device 27 and morpheme analysis device 28, which are shown in FIG. 2. The search device 15 shown in FIG. 1, for example, corresponds to both the index generation device 23 and search device 24, which are shown in FIG. 2.

The points of the document search method of the present invention are as follows.

(1) A re-process scope is extracted from a text obtained as a result of character-recognizing a document image.

(2) A plurality of character strings, including a correct character string, are generated from a candidate character lattice only in the image area of the extracted re-process scope.

(3) The generated character strings are added to an ordinary text obtained by the document recognition.

According to such a search method, by generating a plurality of character strings, the probability that the plurality of character strings include a correct character string is improved. Thus, the extraction accuracy of a correct text for search can be improved, and search accuracy can also be improved accordingly.

By limiting information about a plurality of character strings only to the area of a specific scope and further limiting the information to information in the candidate character lattice of the area, the generation of a meaningless character string can be prevented. Thus, since the plurality of character strings can include a correct character string while the number of generated character strings is reduced, a search time can be reduced and search accuracy can also be improved accordingly.

Since only a document obtained by adding a text for improving search accuracy to an ordinary text is a search target, it is sufficient only if ordinary text search is conducted, and there is no need for a special search system.

FIG. 2 shows the configuration of the document image search apparatus of the present invention. The document image search apparatus comprises a character recognition device 21, a text addition device 22, an index generation device 23, a search device 24, a re-process scope determination device 25, a lattice generation device 26, a character string generation device 27, a morpheme analysis device 28 and a word dictionary 29. Then, the document image search apparatus generates a text for search 35 by adding the text of a character string 34 that is newly obtained from the specific area of a document image 31 to a text 32 obtained by character-recognizing the document image and searches this text 35.

Figure 3:
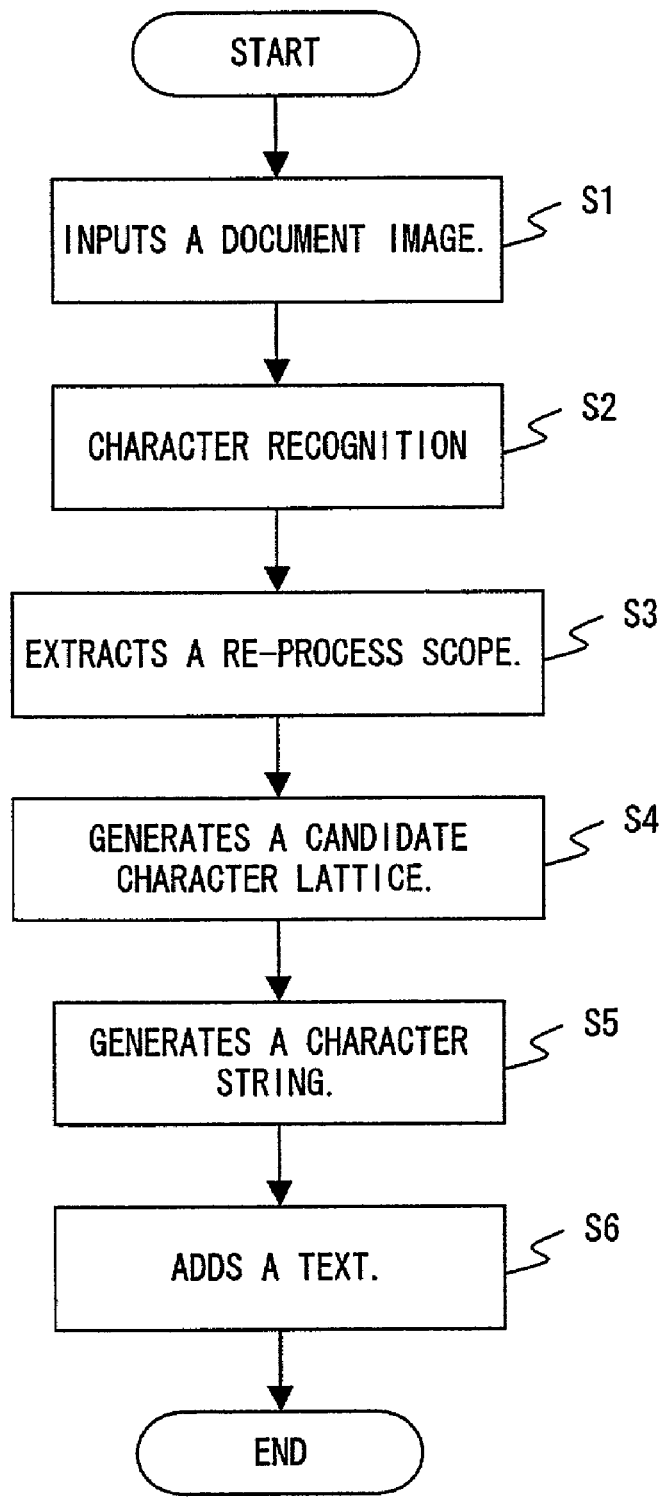
FIG. 3 is a flowchart showing a text addition process.

FIG. 3 is a flowchart showing a text addition process performed by the document image search apparatus shown in FIG. 2. The document image search apparatus first inputs a document image 31 to be searched and stores the image in a memory (step S1). In this case, a user inputs the document image 31 by making an image input device, such as a scanner and the like, optically read a paper document.

Then, the character recognition device 21 character-recognizes the document image 31, evaluates the recognition result and calculates the reliability degree (evaluation value). Then, the device 21 outputs a text 32 as the recognition result as well as the reliability degree (step S2). For the text 32, for example, the first candidate character string in the recognition result is used. Then, the re-process scope determination device 25 extracts the re-process scope 33 of character recognition based on both the text 32 and reliability degree (step S3). For the information of this re-process scope 33, for example, identification information (ID) indicating the location of the corresponding area or its coordinates are used.

Then, the lattice generation device 26 requests the character recognition device 21 to conduct the character recognition of the re-process scope 33 again and generates a candidate character lattice from the result of the newly conducted character recognition (step S4). Then, the character string generation device 27 generates character strings for search 34 from the candidate character lattice (step S5).

Then, the text addition device 22 adds the text of the character strings 34 to the text 32 as other candidates of the recognition result of the re-process scope 33 and generates a text 35 (step S6). This text 35 includes a plurality of candidate character strings for the image of the re-process scope 33.

When such a text addition process is terminated, the index generation device 23 attaches an index for search to the document image 32 using the text 35 obtained as the recognition result. Then, the search device 24 conducts a search using the index for search in response to a query. Thus, the number of search omission due to a character recognition error can be reduced by generating a plurality of candidate character strings for a specific re-process scope 33 and including these character strings in search targets.

Next, each step of the text addition process shown in FIG. 3 is described in more detail.

In step S2, the character recognition device 21 performs a known area identification (layout recognition) process of the document image in the memory and extracts a text area. Then, the device 21 performs a known character recognition process of the text area, obtains a text 32 as the recognition result and stores the text 32 in the memory. In this case, the device 21 also stores the reliability degree of the recognition result.

In step S3, the re-process scope determination device 25 identifies an area with low character recognition reliability and the possibility of including a recognition error or an area with the possibility of including a major keyword by using at least one of the reliability degree of the recognition result and a language process, and extracts those areas as re-process scopes. Methods for extracting such a re-process scope are classified into the following three categories.

(1) Extraction of a Re-process Scope Using a Language Process

An area where characters consecutively continue is calculated in the text of the recognition result using N-gram or word collation, and a re-process scope is calculated using the result. N-gram is a language model of N pieces of consecutive language data for stipulating the relationship between preceding (N−1) pieces of data and the subsequent N-th data as a probability. Such an extraction method includes the followings (a) to (c).

(a) Method Using N-gram (N=2)

The occurrence probability of bi-gram between two characters is calculated as the reliability degree of a language process. If the probability value is larger than a threshold value, it is judged that the characters consecutively continue. This process is consecutively performed for a target area newly obtained by shifting one character at one time. Then, an area where the occurrence probability values of bi-gram are consecutively larger than the threshold value is calculated as a correct reading scope. In this case, a re-process s cope i s an area separated by correct reading scopes (area out of a correct reading scope). Since the linguistic reliability of an area out of a correct reading scope is low, it is considered that the area has the possibility of including a recognition error. Thus, this area is extracted as a re-process scope to conduct character recognition again.

(b) Method Using Word Collation

An area is collated with a word dictionary and the collated area is designated as a correct reading scope. A re-process scope is an area separated by correct reading scopes or a part of a correct reading scope. In the former case, since the linguistic reliability of the area separated by the correct reading scopes is low, this area is extracted as a re-process scope to conduct character recognition again.

In the latter case, for example, an area with a specific morpheme in a correct reading scope is determined as a re-process scope. For the specific morpheme, a specific part of speech, such as a noun, an unregistered word that is not registered in the word dictionary and the like, are used. Since such an area has the possibility of including a keyword indispensable in search, it is preferable for the recognition result not to include a recognition error. Thus, this area is extracted as a re-process area to conduct character recognition again.

Alternatively, a correct reading scope can be separated by a specific designated separator and a re-process scope can be determined. For example, in the case of Japanese, both a boundary between two character types, such as kanji, hiragana, katakana, alphabet and the like, and a punctuation mark are used for the specific separator.

(c) Method Using both N-gram and Word Collation

A new correct reading scope is obtained by calculating the logical OR (or logical AND) of a correct reading scope obtained using bi-gram and a correct reading scope obtained by word collation. In this case, a re-process scope is an area separated by correct reading scopes.

(2) Extraction of a Re-process Scope Using the Reliability Degree of a Recognition Result An area with low character recognition reliability is calculated in the text of the recognition result using the reliability degree of the recognition result, and the area is designated as a re-process scope. Since an area with low character recognition reliability has the possibility of including a recognition error, this area is extracted as a re-process scope to conduct character recognition again. Such an extraction method includes the followings (a) and (b).

(a) An area where characters with lower reliability degree of the recognition result than a threshold value consecutively continue is calculated as a re-process Scope.

(b) An area where characters with higher reliability degree of the recognition result than a threshold value consecutively continue is calculated as a correct reading scope. A re-process scope is an area separated by correct reading scopes.

(3) Extraction of a Re-process Scope Using both a Language Process and the Reliability Degree of the Recognition Result A correct reading scope with high linguistic reliability is obtained by one of the extraction methods using a language process described above. Independently of that, a correct reading scope with high reliability degree of a recognition result is obtained by one of the extraction methods using the reliability degree of the recognition result described above. The combination of two kinds of extraction methods can be arbitrarily selected. Then, a new correct reading scope is obtained by calculating the logical OR (or logical AND) of the two correct reading scopes. A re-process scope is an area separated by new correct reading scopes.

For example, if a logical AND is used, an area where the reliability degree of the recognition result is higher than a threshold value and characters with high reliability of the language process consecutively continue, becomes a correct reading scope. Then, areas other than the correct reading scopes are extracted as a re-process scope.

Next, a method for extracting a part of a correct reading scope as a re-process scope by the extraction method (1)–(b) described above is described in detail.

In this case, the re-process scope determination device 25 requests the morpheme analysis device 28 to morpheme-analyze the test 32 of the recognition result. The morpheme analysis device 28 analyzes the text 32 while referring to the word dictionary 29. Then, the re-process scope determination device 25 automatically distinguishes the area of a major keyword in search and extracts the area as a re-process scope. Such an extraction method includes the following two methods.

(1) A word area, such as a specific part of speech like a noun, an unregistered word and the like, is extracted as a major keyword area from the result of a morpheme analysis. An unregistered word includes an abbreviation and the like.

(2) A word area, such as a specific part of speech, an unregistered word and the like is extracted from the result of a morpheme analysis. Then, areas before and after the word area are searched and a result obtained by extending the word area up to a specific separator is designated as a major keyword area. For the specific separator, both the boundary between character types and punctuation mark described above are used. Alternatively, a position where a character with the lower reliability degree of the recognition result than the threshold value appears can also be used for the specific separator.

When a re-process scope is extracted thus, in step S4, the lattice generation device 26 requests the character recognition device 21 to conduct the character recognition of the extracted re-process scope again. The character recognition device 21 character-recognizes the image in the re-process scope and outputs a plurality of candidate characters for each character area. Then, the lattice generation device 26 generates a candidate character lattice using the outputted candidate characters.

A candidate character lattice is a set of recognition results based on a variety of segmentation positions and is represented by combinations of a candidate character code and a recognition distance value using a pattern extracted from a character string image by character segmentation as a unit. A virtual node number is assigned to a segmentation position between extracted patterns, and each pattern included in the candidate character lattice is represented using node numbers before and after the pattern.

Figure 4:
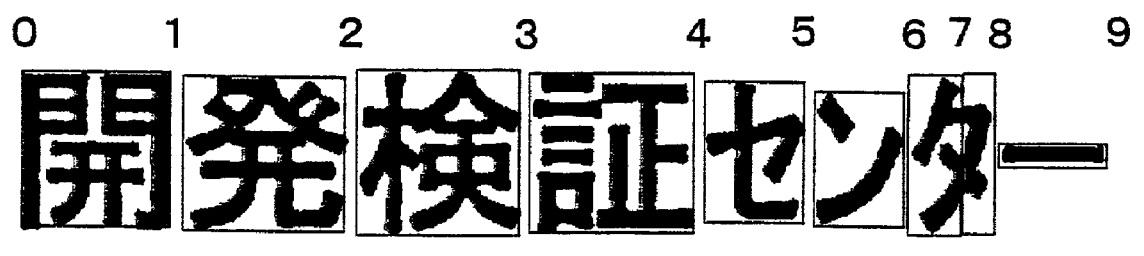

For example, the candidate character lattice shown in FIG. 5 is generated from the character string image shown in FIG. 4. In FIG. 4, numerals of 0 to 9 indicate node numbers. In FIG. 5, a plurality of candidate characters on each line represent the recognition results of a pattern between node numbers i and j. A numerical value attached to each candidate character represents a distance value.

For example, ten candidate characters on the first line represent the recognition results of a pattern between node numbers 0 and 1, and these candidate characters are arranged in the ascending order of distance values (descending order of reliability degrees). Therefore, "開", which is a candidate character located at the top, corresponds to the first candidate character.

Alternatively, in the candidate character lattice, the reliability degree of a recognition result corresponding to each candidate character code can be used instead of a distance value. The reliability degree is calculated using, for example, a distance value. The smaller the distance value, the higher the reliability degree.

When a candidate character lattice is extracted, in step S5, the character string generation device 27 generates character strings from the candidate character lattice generated from the area of a re-process scope according to the part-of-speech information in the area. In this case, a character string is generated taking into consideration not only the first candidate character, but also other candidate characters. If the major keyword area described above is extracted as a re-process scope, there are two character string generation methods as follows.

(1) In the Case of a Noun

The character string generation device 27 requests the morpheme analysis device 28 to morpheme-analyze a candidate character lattice. The morpheme analysis device 28 consults the word dictionary 29 using a path in the candidate character lattice and extracts a word that is collated and matched with the word dictionary 29.

A method for consulting a dictionary using a candidate character lattice is disclosed, for example, in "Dictionary Search Apparatus and Method Using a Lattice as a Key" (Japanese Patent Application Laid-open No. 9-134369). According to this method, by tracking candidate characters in the candidate character lattice, character strings corresponding to a plurality of paths are generated, and each character string is collated with a word in the word dictionary 29. Then, a character string registered in the word dictionary 29 is extracted and stored together with a corresponding position in the candidate character lattice.

Then, the character string generation device 27 receives information about the extracted word from the morpheme analysis device 28 sequentially combines the words based on the connection relation and generates a character string stretching from the starting node until the ending node of the candidate character lattice. In this case, if there are a plurality of word combinations, all character strings corresponding to the combinations are generated.

(2) In the Case of an Unregistered Word

The character string generation device 27 totals distance values of candidate characters in a path obtained from the candidate character lattice and calculates a distance value of the path. The device 27 selects N higher-order paths in ascending order of the distance value of a path and generates a character string determined by those paths. N is a prescribed number of one or more. In this case, a character string is generated by connecting a plurality of candidate characters included in each path.

This method is used, for example, in the known DP (dynamic programming) matching process and the like of "Segmentation and Recognition of Hand-Written Character String using Linguistic Information" (Murase et al., Journal of The Institute of Electronics, Information and Communication Engineers, Vol. J69-D, No. 9, pp.1292–1301, 1986).

If there are two or more character segmentation methods for one pattern, the distance value is normalized using the number of basic patterns (minimum segmentation unit) composing the pattern. Then, N higher-order paths are selected in ascending order of the total value of the normalized distance values.

Figure 6:
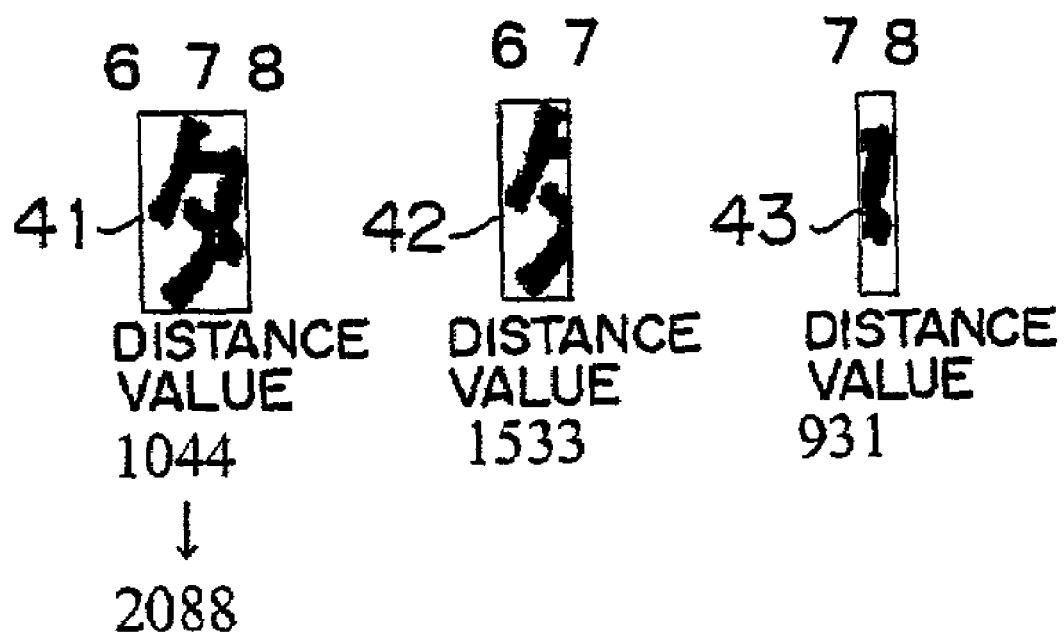
FIG. 6 shows the normalization of a distance value.

FIG. 6 shows a pattern 41 between node numbers 6 and 8 shown in FIG. 4 and two basic patterns 42 and 43 (in this case, basic rectangles) included inside the pattern 41. As shown in FIG. 5, the first candidate character distance values of these patterns 41, 42 and 43 are 1044, 1533 and 931, respectively. In this case, the distance value of the pattern 41 is normalized by multiplying the distance value of the pattern 41 by two, which is the number of basic patterns inside (number of candidate characters).Therefore, the distance value of the first candidate character of the pattern 41 becomes 2088.

If a reliability degree is used instead of a distance value, the reliability degree of a path is calculated by totaling a plurality of pieces of the reliability degree of candidate characters in a path. Then, a character string is generated by selecting N higher-order paths in a descending order of the reliability degree of the path. In this case too, the reliability degree is normalized using the number of basic patterns.

When a character string is generated from a candidate character lattice thus, in step S6, the text addition device 22 adds the generated character string to the text 32 as an additional text for search and stores the obtained text 35.

For example, when the character string image shown in FIG. 7 is extracted as are-process scope, the candidate character lattice shown in FIG. 8 is generated. In this case, as the character strings of a noun, the character strings (word list) shown in FIG. 9 is generated. As the character strings of an unregistered word, the character strings (word list) shown in FIG. 10 is generated. Then, these word lists are added as an additional text.

As described above, by determining a re-process scope by extending a specific word area, the probability of compensating for wrong recognition and adding a correct character string is improved.

For example, if morpheme analysis is made when a character string "ローリング" is wrongly recognized as "ローリンク", "ローリンク" is divided into two areas of "ロ ー" and "リンク". As a result, if a character string is generated using a candidate character lattice, a plurality of words are generated from the area "ロ ー" and a plurality of words, including a correct word "リンク", are generated from the area "リンク". However, a long word "ローリンク", which is obtained by connecting "ローリング" and "リンク", is not reproduced.

In this case, if the word area is extended and the area "ローリンク" is designated as a re-process scope, a plurality of words, including a correct word "リンク", can be added as an additional text.

Although the configuration shown in FIG. 2 corresponds to the configuration in the case of index search, the present invention is also applicable to arbitrary document image search. For example, in the case of grep search, the search device 24 can directly search the text 35 outputted by the text addition device 22.

The document image search apparatus shown in FIG. 2 can also be configured using an information-processing device (computer) as shown in FIG. 11. The information-processing device shown in FIG. 11 comprises a CPU (central processing unit) 51, a memory 52, an input device 53, an output device 54, an external storage device 55, a medium driving device 56, a network connection device 57 and an image input device 58, and those devices are connected to one another by a bus 59.

The memory 52 is, for example, a ROM (read-only memory), a RAM (random-access memory) and the like, and it stores both a program and data to be used for the process. The CPU 51 performs necessary processes using the memory 52 and running the program.

For example, the character recognition device 21, text addition device 22, index generation device 23, search device 24, re-process scope determination device 25, lattice generation device 26, character string generation device 27 and morpheme analysis device 28, which are shown in FIG. 2, are stored in the memory as a program. The word dictionary 29, document image 31, texts 32 and 35, re-process scopes 33 and character strings 34 are stored in the memory 52 as data.

The input device 53 is, for example, a keyboard, a pointing device, a touch panel and the like, and it is used for a user to input instructions and information. The output device 54 is, for example, a display, a printer, a speaker and the like, and it is used to output both an inquiry and a process result to a user.

The external storage device 55 is, for example, a magnetic disk device, an optical disk device, a magneto-optical disk device and the like. The information processing device stores both the program and data in this external storage device 55 in advance, and uses them by loading them into the memory 52, as required. The external storage device 55 is also used as a database for storing both a document image 31 and text 35.

The medium-driving device 56 drives a portable storage medium 60 and accesses the recorded content. For the portable storage medium 60, an arbitrary computer-readable storage medium, such as a memory card, a floppy disk, a CD-ROM (compact-disk read-only memory), an optical disk, a magneto-optical disk and the like, is used. A user stores both the program and data in this portable storage medium 60 in advance, and uses them by loading them into the memory 52, as required.

The network connection device 57 is used for a connection to an arbitrary communications network, and it transmits/receives data accompanying communications. The information-processing device receives both the program and data from an outside device through the network connection device 57 and uses them by loading them into the memory 52, as required.

The image input device 58 is an image pickup device, such as a CDD (charge-coupled device) camera, a scanner and the like, and it is used to input a document image, including a color image.

Figure 12:
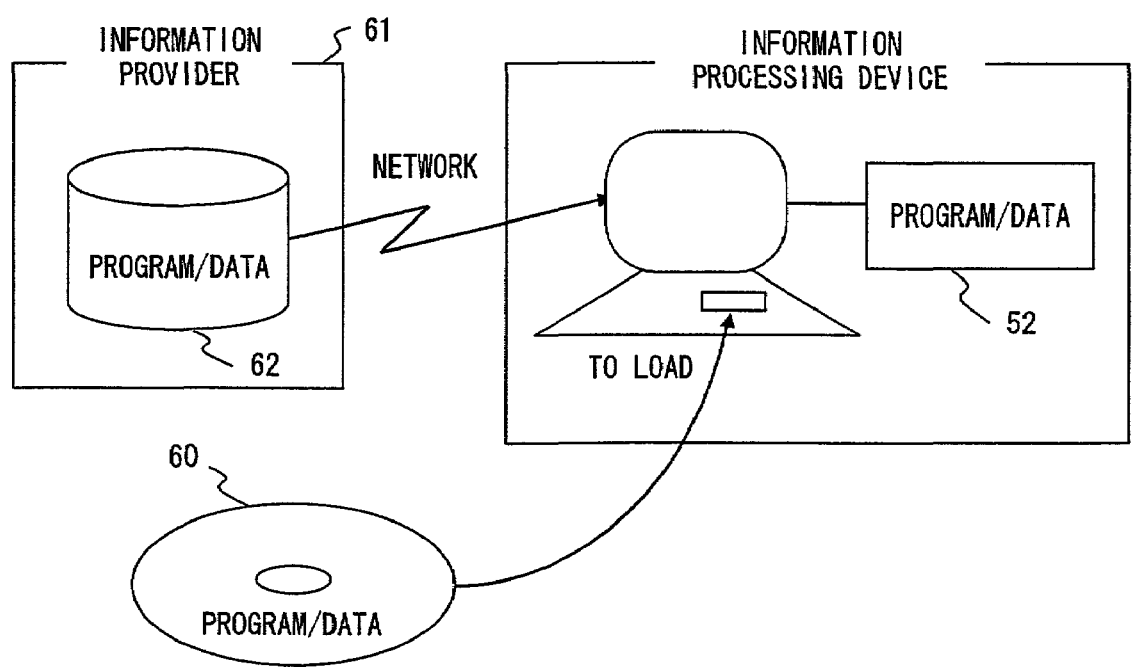
FIG. 12 shows storage media.

FIG. 12 shows computer-readable storage media for providing the information-processing device shown in FIG. 11 with both a program and data. The program and data stored in the portable storage medium 60 or the database 62 of a server 61 are loaded into the memory 52. In this case, the server 61 generates a propagation signal for propagating the program and data, and transmits them to the information-processing device through an arbitrary transmission medium in the network. Then, the CPU 51 performs necessary processes using the data and running the program.

As a result of conducting an evaluation experiment using such a document image process apparatus, compared with the prior art, the search accuracy of a text of a recognition result has been improved, and it has been verified that the necessary search time hardly increases.

According to the present invention, in the search of document images using character recognition, the search accuracy of a text of a recognition result can be improved, and high-accuracy search is possible even if there is a recognition error. Compared with the prior art, a search time hardly increases and no special search system is needed.

What is claimed is:

1. A document image search apparatus, comprising:
   an input device inputting a document image;
   a character recognition device performing character recognition of the document image and generating a first text of a recognition result;
   a scope determination device determining a re-process scope of character recognition in the document image;
   an addition device requesting said character recognition device to again conduct the character recognition with the re-process scope based on output from said scope determination device, generating a second text different than the first text based on the character recognition with the re-process scope, and generating a third text by adding the second text to the first text; and
   a search device performing a search using the third text for the search.

2. The document image search apparatus according to claim 1, wherein said scope determination device performs a language process for the text of the recognition result and extracts an area with low linguistic reliability as the re-process scope.

3. The document image search apparatus according to claim 1, wherein said scope determination device extracts an area with low reliability of character recognition as the re-process scope using a reliability degree of the text of the recognition result.

4. The document image search apparatus according to claim 1, wherein said scope determination device obtains an area where a reliability degree of the text of the recognition result is higher than a threshold value and where characters with high language process reliability consecutively continue in the text of the recognition result, and extracts an area other than the obtained area as the re-process scope.

5. The document image search apparatus according to claim 1, wherein said scope determination device collates the text of the recognition result with a word dictionary and extracts an area with a specific morpheme as the re-process scope.

6. The document image search apparatus according to claim 5, wherein said scope determination device extracts an area with at least one of a noun and an unregistered word as the area with the specific morpheme.

7. The document image search apparatus according to claim 1, wherein said scope determination device collates the text of the recognition result with a word dictionary and extracts an area separated by a specific separator as the re-process scope.

8. The document image search apparatus according to claim 7, wherein said scope determination device uses at least one of a boundary between character types and a punctuation mark for the specific separator.

9. The document image search apparatus according to claim 1, wherein said scope determination device collates the text of the recognition result with a word dictionary, extracts an area with a specific morpheme and extracts a result obtained by extending the extracted area up to a specific separator as the re-process scope.

10. The document image search apparatus according to claim 1, wherein said addition device includes:
    a lattice generation device requesting said character recognition device to perform character recognition of the re-process scope and generating a candidate character lattice of the re-process scope; and
    a character string generation device generating a character string from the candidate character lattice taking into consideration not only a first candidate character but also other candidate characters and outputting the character string as a text of a re-recognition result.

11. The document image search apparatus according to claim 10, wherein said character string generation device collates the candidate character lattice with a word dictionary and generates the character string based on a word registered in the word dictionary.

12. The document image search apparatus according to claim 10, wherein said character string generation device calculates distance values of paths obtained from the candidate character lattice, selects N higher-order paths in ascending order of the distance values of the paths and generates character strings that are determined by the selected paths.

13. The document image search apparatus according to claim 12, wherein said character string generation device normalizes the distance values using a number of basic patterns, each of which is a minimum unit of character segmentation, and selects the N paths using the normalized distance values.

14. The document image search apparatus according to claim 10, wherein said character string generation device calculates reliability degree of paths obtained from the candidate character lattice, selects N higher-order paths in descending order of the reliability degree of the paths and generates character strings that are determined by the selected paths.

15. A computer-readable storage medium which stores a program for enabling a computer to execute a process, the process comprising:

performing character recognition of a document image and generating a first text of a recognition result;

determining a re-process scope of character recognition in the document image;

performing character recognition again with the re-process scope;

generating a second text different than the first text based on the character recognition with the re-process scope;

generating a third text for searching by adding the second text to the first text; and storing the third text for searching.

16. A document image search method, comprising:

performing character recognition of a document image and generating a text of a recognition result;

determining a re-process scope of character recognition in the document image;

performing character recognition again with the re-process scope;

generating a second text of different than the first text based on the character recognition with the re-process scope;

generating a third text for searching by adding the second text to the first text; and storing the third text for searching; and performing a search using the third text.

17. A document image search apparatus, comprising:

input means for inputting a document image;

character recognition means for performing character recognition of the document image and generating a text of a recognition result;

a scope determination means for determining a re-process scope of character recognition in the document image;

addition means for requesting said character recognition means to again conduct the character recognition with the re-process scope based on output from said scope determination means, generating a second text different than the first text based on the character recognition with the re-process scope, and generating a third text by adding the second text to the first text; and search means for performing a search using the third text for search.

* * * * *